Figure 1:
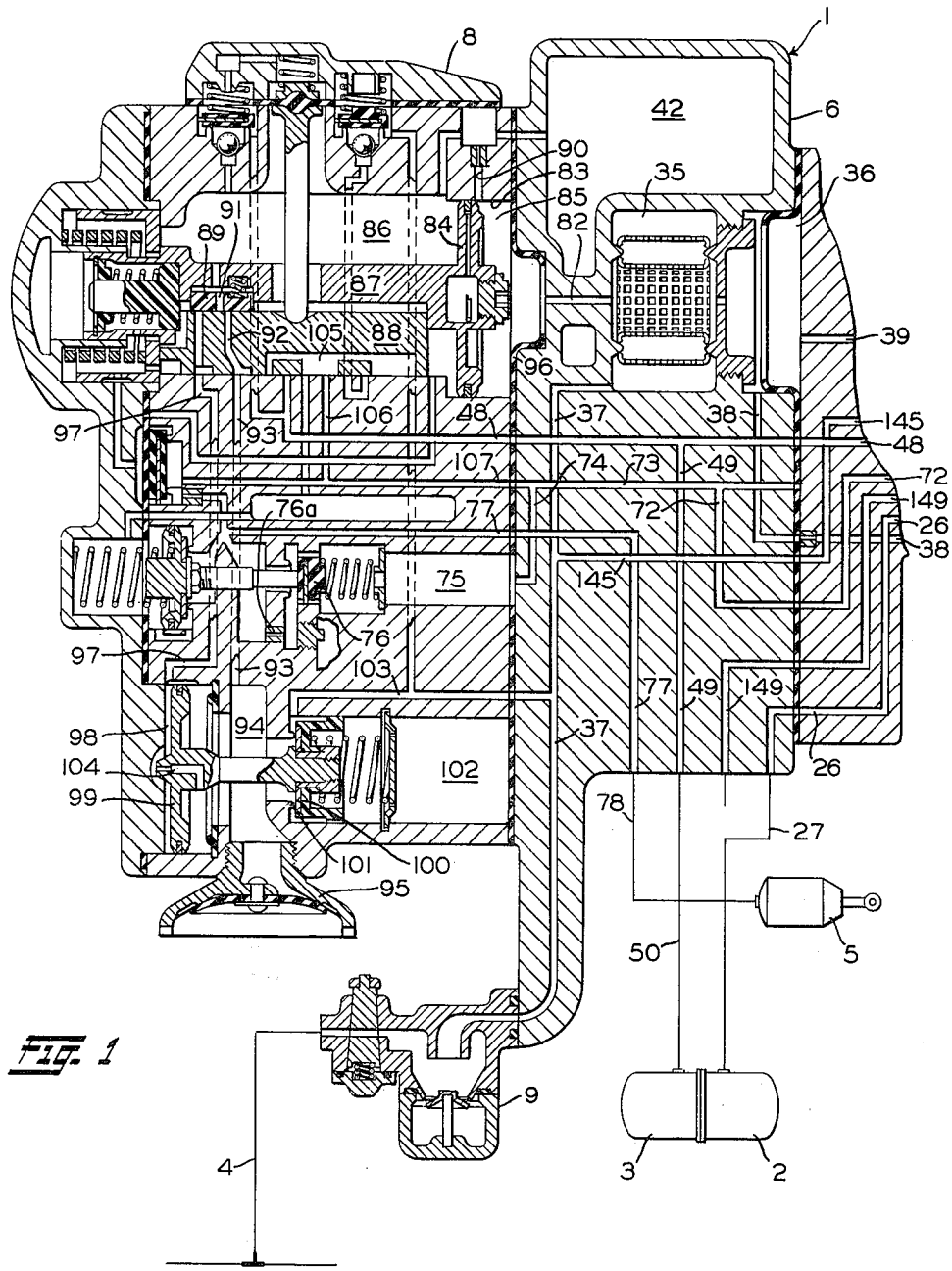

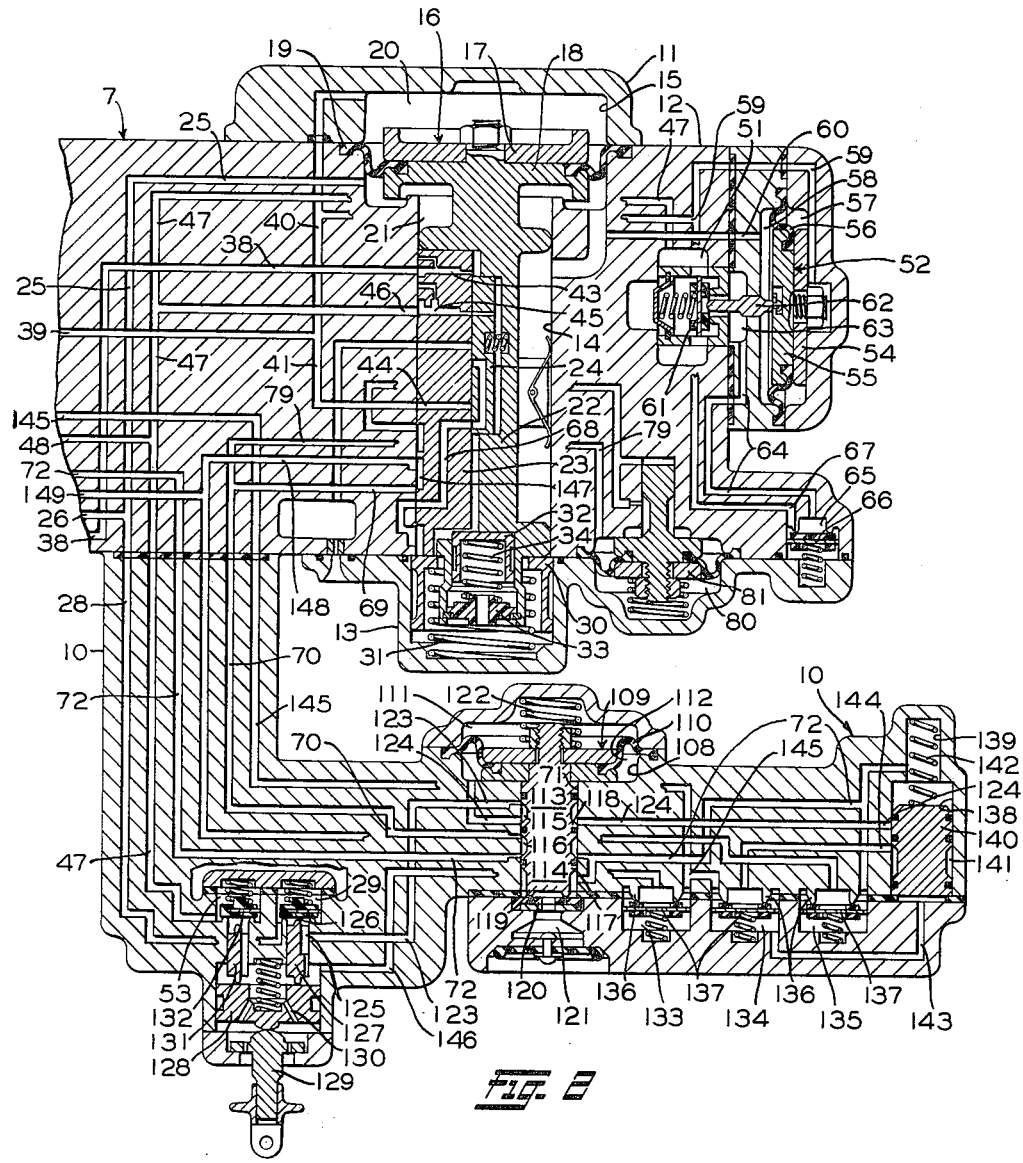

3,232,678
FLUID PRESSURE BRAKE CONTROL
VALVE DEVICE
William G. Wilson, Irwin, Pa., assignor to Westinghouse Air Brake Company, Wilmerding, Pa., a corporation of Pennsylvania
Filed Dec. 20, 1962, Ser. No. 246,050
11 Claims. (Cl. 303—80)

This invention relates to a control valve device and more particularly to a new and improved fluid pressure brake control valve device for use on railway freight cars.

The standard fluid pressure brake equipment now used on railway freight cars in the United States includes a normally charged brake pipe, an auxiliary reservoir, an emergency reservoir, a brake cylinder device, and a brake control valve device that has a service portion and an emergency portion. Upon a reduction in brake pipe pressure at a service rate, the service portion of the brake control valve device operates to effect the supply of fluid under pressure from the auxiliary reservoir to the brake cylinder device to cause a service brake application on the freight car. Upon a reduction in brake pipe pressure at an emergency rate, the service and emergency portions of the brake control valve device operates respectively to effect the supply of fluid under pressure from the auxiliary reservoir and from the emergency reservoir to the brake cylinder device to cause an emergency brake application.

Upon increasing the pressure in the brake pipe to its normal charged value, subsequent to either a service or an emergency brake application on the freight car, the brake control valve device operates in response to this increase in brake pipe pressure to effect a release of the brakes and recharge of the auxiliary and emergency reservoirs to the same pressure as the normally charged pressure present in the brake pipe.

The brake control valve device included in the standard fluid pressure brake equipment now in use on railway freight cars in the United States is the well-known AB brake control valve device which is substantially the same as the brake control valve device shown and described in Patent No. 2,031,213 (WAB Case No. 3447), issued February 18, 1936, to Clyde C. Farmer and assigned to the assignee of the present application. The well-known AB brake control valve device is provided with a back dump or accelerated release feature which provides for, when effecting a brake release subsequent only to an emergency brake application, connecting the brake cylinder device and the auxiliary reservoir, in which the pressure is higher than in the brake pipe, to the brake pipe to cause an equalization of pressure therebetween and, therefore, an accelerated build-up of the pressure in the brake pipe while at the same time insuring a rapid release of the brakes as a result of the reduction in the pressure thus effected in the brake cylinder device.

The brake pipe pressure used or carried on passenger trains is usually one hundred and ten pounds per square inch while the brake pipe pressure used on freight trains is usually seventy pounds per square inch. Subsequent to effecting an emergency brake application on a passenger train, the equalization pressure between the auxiliary reservoir and the brake cylinder device is approximately eighty-five to ninety pounds per square inch, while the equalization pressure on a freight train subsequent to an emergency brake application is sixty pounds per square inch. It is thus apparent that in recharging the brake pipe, subsequent to an emergency brake application, from zero pressure to its normal charged value, the fluid under pressure supplied from the auxiliary reservoir and the brake cylinder to the brake pipe aids materially in recharging the brake pipe to its normal charged value.

When a service brake application is made, the emergency reservoir remains fully charged. Therefore, in order to hasten the release of the brakes subsequent to a service brake application, there has been added to the well-known AB brake control valve device a service accelerated release valve device that is operative, upon releasing the brakes and recharging the brake equipment subsequent to a service brake application, to effect the supply of fluid under pressure from the fully charged emergency reservoir to the brake pipe to thereby aid in and hasten the recharging of the brake pipe.

In actual practice, it is often necessary that, subsequent to cutting out a car from a train and setting it off on a siding, the brakes on the car be released so that the car can be moved in switching operations. Therefore, there has also been added to the brake control valve device described in the above-mentioned Farmer patent and used in the standard fluid pressure brake equipment now in use on railway freight cars in the United States, in addition to the above-mentioned service accelerated release valve device, a manually operative brake cylinder release valve device that provides for releasing fluid under pressure from the brake cylinder device without effecting a release of the fluid under pressure in the auxiliary and emergency reservoirs included in the freight car brake equipment.

Also in actual practice, a car that has been cut out and set off from a passenger train may be subsequently coupled into either a passenger thain or a freight train. If the car is again coupled into a passenger train, no problem is encountered. However, let it be supposed that a freight car that is provided with the above-described brake equipment including an accelerated service release valve device and also a manually operative brake cylinder release valve device, has been cut out and set off from a passenger train and has subseqently had the brakes thereon released by manual operation of the brake cylinder release valve device. If this car is now coupled into a freight train, the emergency portion of the brake control valve device thereon will not be effective, when it is moved to its release position in response to recharging the brake pipe, to connect the auxiliary reservoir to the brake pipe since the auxiliary reservoir was cut off from the brake cylinder device by the previous manual operation of the brake cylinder release valve device to release fluid under pressure from the brake cylinder device. Furthermore, the service portion of the brake control valve device will not be moved, in response to fully recharging the brake pipe to seventy pounds per square inch, from its service position to its release position since this brake pipe presure acting on one side of the abutment that operates the service portion is less than the equalized pressure between the auxiliary reservoir and brake cylinder device of approximately eighty-five to ninety pounds per square inch acting on the opposite side of this abutment. Accordingly, the service portion of the brake control valve device can only be actuated from its service position to its release position by a trainman first manually operating the auxiliary reservoir release valve device to vent fluid under pressure in the auxiliary reservoir and active on the opposite side of the abutment to atmosphere until the pressure acting thereon is reduced below the brake pipe pressure of seventy pounds per square inch acting on the one side of this abutment.

Accordingly, it is an object of this invention to provide a novel brake control valve device that includes, in addition to the conventional service portion and emergency portion, an accelerated service release valve device, a diaphragm type brake cylinder release valve device, a manually operative reservoir release valve device for controlling operation of the diaphragm type brake cylinder release valve device, and an automatically operative piston valve means operable in response to recharging the brake pipe to, for example, seventy pounds per square inch subsequent to effecting a complete release of fluid under pressure from the brake cylinder device to atmosphere by operation of the brake cylinder release valve device, for establishing a communication between an auxiliary reservoir, charged to for example, one hundred and ten pounds per square inch, and the brake pipe to cause equalization of pressure therebetween thereby enabling a railway freight car provided with this novel brake control valve device to operate satisfactorily on a freight train subsequent to this freight car being set off from a passenger train and having the brakes thereon released by manual operation of the brake cylinder release valve device.

The automatic brake pipe pressure operated piston valve means by effecting an equalization of pressure between the auxiliary reservoir and the brake pipe, subsequent to effecting a complete release of fluid under pressure from the brake cylinder device by operation of the brake cylinder release valve device, irrespective of the excess of the reduced pressure in the auxiliary reservoir after an emergency brake application has been effected over the normal fully charged pressure of the brake pipe, since under certain circumstances the normal fully charged pressure in the brake pipe may be lower than the reduced pressure in the auxiliary reservoir, assures that the service portion of the brake control valve device is moved from its emergency position to its release position in response to an increase in the pressure in the brake pipe after the equalization occurs. This equalization of pressure between the auxiliary reservoir and the brake pipe further assures operation of the accelerated service release valve device in response to an increase in brake pipe pressure after the occurrence of this equalization.

In the accompanying drawings:

FIGS. 1 and 2 taken together constitute a diagrammatic view mainly in section of an improved and upgraded "AB" type brake control valve device embodying the invention which, shows the entire control valve device in release position.

As shown in the accompanying drawings, an improved and upgraded brake equipment for a railway freight car comprises a brake control valve device 1, an auxiliary reservoir 2, an emergency reservoir 3, a brake pipe 4 and a brake cylinder 5.

The brake control valve device 1 comprises a pipe bracket 6, a service valve portion 7 mounted on one face of the pipe bracket 6, an emergency valve portion 8 mounted on another face of pipe bracket 6, a combined dirt collector and cut-out cock 9 mounted on a lower portion of the pipe bracket 6, and a brake cylinder release portion 10 mounted on the service valve portion 7.

The brake control valve device 1 is of the well-known "AB" type, and since this device is well known by those skilled in fluid pressure brake art, the description thereof will be limited to the essential improved features. Service valve portion 7 comprises a sectionalized casing having an upper cover section 11, a main body section 12 and a lower cup-shaped cover section 13 secured together by any suitable means.

Extending upwardly and centrally through the main body section 12 is a stepped bore 14 having an enlarged upper end bore portion. Upper cover section 11 has its lower end portion suitably recessed to provide a bore 15 having its central axis coaxial with the axis of the enlarged bore portion of bore 14 such that the clamping of the upper cover section 11 to the main body section 12 presents a continuous bore 15 with the enlarged upper end bore portion of bore 14. A movable abutment, such as a diaphragm type piston 16, is suitably located between the upper cover section 11 and the main body section 12. Diaphragm piston 16 comprises a centrally apertured upper follower disc 17 and a lower follower disc 18 having a threaded plug member extending upwardly from the center thereof through the aperture in follower disc 17 to receive a nut for clamping the inner peripheral edge of an annular resilient diaphragm 19 between the lower follower disc 18 and the apertured upper follower disc 17. The outer marginal edge of the annular resilient diaphragm 19 is suitably clamped between the upper cover section 11 and the main body section 12.

The movable abutment or diaphragm type piston 16 separates the sectionalized casing into an upper piston chamber 20 and lower valve chamber 21. Diaphragm type piston 16 has a downwardly extending stem 22 having portions thereof slidably guided by the bore 14 such that the stem 22 is adapted to actuate a main slide valve 23 and a graduating slide valve 24 suitably connected thereto in a manner well understood in the art. Lower valve chamber 21 is connected to the auxiliary reservoir 2 by way of passageways 25, 26 and a conduit 27. Passageway 25 is connected by a branch passageway 28 to a valve chamber 29 in the brake cylinder release valve portion 10 for a purpose to be described.

Slidably received within the cup-shaped cover section 13 is a return spring cage 30, which cage 30 is suitably annularly recessed to provide a seat for one end of a return spring 31, such that the other end of return spring 31 is seated on the lower bottom surface of cup-shaped cover section 13 thereby biasing return spring cage 30 upwardly into engagement with the bottom end portion of stem 22. Stem 22 is suitably centrally recessed at its lower end portion to slidably receive a cylindrical stabilizer spring guide member 32. The lowermost end portion of stem 22 has a stabilizer spring seat 33 mounted thereon to provide a seat for a stabilizer spring 34 mounted in the central recess of the lower end portion of stem 22. Spring 34 has its lower end portion seated on the stabilizer spring seat 33 and its upper end engaging the stabilizer spring guide 32 to thereby bias the stabilizer spring guide 32 into abutting engagement with the main slide valve stem 22 as is well understood in the art.

Pipe bracket 6 has a pair of interconnected brake pipe chambers 35 and 36, with chamber 35 connected via a passageway 37 to the dirt collector 9 and thence to the brake pipe 4. Chamber 36 is connected via a passageway 38 to the lower valve chamber 21 for charging such chamber, and connected via passageway 39 with branch passageways 40 and 41, respectively, for connection to the piston chamber 20 and the lower valve chamber 21, respectively. In addition, pipe bracket 6 has a quick-action chamber 42 for connection to the emergency valve portion 8.

As shown in the drawings, both the main slide valve 23 and the graduating slide valve 24 are in their charging position, wherein ports 43 and 44 in the main slide valve 23 connect with passageways 38 and 41, respectively, which passageways 38 and 41 are connected to the brake pipe chamber 36. Graduating slide valve 24 in the position shown blocks port 44 and prevents the flow of brake pipe fluid from passageway 41, however, port 43 communicates passageway 38 with the valve chamber 21 for charging thereof. A port 45 in the main slide valve 23 interconnects the lower valve chamber 21 with a passageway 46, which passageway 46 is connected to the emergency reservoir 3 via passageways 47, 48, 49 and conduit 50. Valve chamber 21 is also connected to a chamber 51 associated with an accelerated release valve device 52 to be described and a chamber 53 in the brake cylinder release valve portion 10 via passageway 46 and the respective opposite ends of passageway 47.

Accelerated release valve device 52 comprises a movable abutment having a pair of follower discs 54 and 55 which are suitably secured together, thereby clamping an annular resilient diaphragm 56 at its inner periphery therebetween, while the outer peripheral edge of the resilient diaphragm 56 is secured between two portions of the casing section of the service valve portion 7. The follower discs 54 and 55 and resilient diaphragm 56 of accelerated release valve device 52 cooperate with the two portions of the sectionalized casing of the service valve portion 7 to define a pair of chambers 57 and 58 disposed respectively on the opposite sides of the diaphragm 56. Chamber 57 is connected to the brake pipe 4 and brake pipe chamber 36 by passageways 59, 40 and 39 such as to maintain chamber 57 at substantially the same pressure as the pressure in the brake pipe 4. Chamber 58 is connected to the lower valve chamber 21 by a passageway 60 to maintain the pressure in chamber 58 at substantially the same pressure as in the auxiliary reservoir 2.

A check valve 61 is arranged in chamber 51 to be displaced by a stem 62 suitably connected to the diaphragm 56 of the accelerated release valve device 52 so that upon displacement thereof pressurized fluid from chamber 51 flows into a chamber 63, which chamber 63 is connected via a passageway 64 to a chamber 65 housing a spring-biased check valve 66, such that upon displacement of check valve 66 through pressurization of chamber 65, pressurized fluid flows from passageway 64 to a passageway 67 for connection to the passageway 59 for directing the pressurized fluid through passageways 40 and 39 to the brake pipe 36.

Main slide valve 23 has a passage 68 which in service position of the slide valve 23 is uncovered by graduating slide valve 24 and registers with port and corresponding passageway 69 so that air under pressure from the auxiliary reservoir 2 and valve chamber 21 flows to the brake cylinder 5 via passageways 69, 70, bore 71, and passageways 72, 73, 74, chamber 75, past the inshot valve 76 in a manner well understood in the art, passageway 77 and conduit 78.

Passageway 69 has a branch passageway 79 connected to a chamber 80 housing a conventional quick service limiting valve 81.

Brake pipe chamber 35 is connected via a passageway 82 to an enlarged bore 83 in the emergency valve portion 8, which bore 83 slidably receives an emergency piston 84. Emergency piston 84 cooperates with bore 83 to define a forwardly disposed piston chamber 85 and a rearwardly disposed valve chamber 86. Emergency piston 84 has a rearward extending stem 87 which contains a main slide valve 88 and a graduated slide valve 89 mounted on the main slide valve 88, such that the two slide valves 88 and 89 are connected for movement by the emergency piston 84 in the usual manner.

When the brake pipe 4 and thereby the piston chamber 85 are charged with fluid under pressure, the emergency piston 84 and slide valve 88 and 89 will occupy their normal position, in which they are shown in FIG. 1. With the emergency piston 84 in this position, a feed port 90 communicates piston chamber 85 with valve chamber 86 for supplying fluid under pressure from the brake pipe 4. In addition, piston chamber 85 communicates with quick action chamber 42 through feed port 90 for charging thereof with fluid at the same pressure as in the brake pipe 4.

Upon a service rate of reduction of pressurized fluid in brake pipe 4, fluid pressure in piston chamber 85 will also be reduced, whereupon quick action chamber pressure in chamber 86 will move emergency piston 84 along with graduated slide valve 89 in the direction of chamber 85 to a position in which a port 91 in the graduated slide valve 89 registers with a port 92 in the main slide valve 88. Pressurized fluid from valve chamber 86 and quick action chamber 42 will flow through ports 91 and 92, through a passageway 93 to a vent valve chamber 94 and thence to atmosphere through a protected exhaust port fitting 95. This release of fluid under pressure from the valve chamber 86 and quick action chamber 42 is accomplished at a service rate which is at the same rate as the reduction in brake pipe pressure on the opposite side of piston 84 in chamber 85 and serves to thereby stop movement of the piston 84 in the service position as is well understood in the art.

However, upon an emergency rate of reduction of brake pipe pressure, the venting capacity of ports 91 and 92 is insufficient to reduce the pressure of fluid in valve chamber 86 as fast as the pressurized fluid is reduced in piston chamber 85 so that a differential pressure is produced between the pressure in piston chamber 85 and the pressure in valve chamber 86, which differential pressure is of such a degree as to cause the emergency piston 84 to move into an emergency position, in which the forward portion of emergency piston 84 engages a gasket 96. Gasket 96 is clamped between the pipe bracket 6 and the casing of the emergency portion 8. The emergency piston 84, as it is thus moved, will shift the main slide valve 88 to an emergency position which uncovers a port 97 in the emergency portion 8, whereby fluid under pressure will then flow from valve chamber 86 and quick action chamber 42 via port 97 to a chamber 98 for actuating a vent valve piston 99 slidably mounted therein. Vent valve piston 99 has a spring-biased vent valve 100 mounted on a stem portion thereof, which vent valve 100 is normally biased into seating engagement with a valve seat member 101. Pressurization of chamber 98 actuates vent valve piston 99 to unseat the vent valve 100 from the valve seat member 101 to thereby vent rapidly at an emergency rate the fluid under pressure in a chamber 102 that is connected directly via a passageway 103 and passageway 37 to the brake pipe 4. The fluid pressure in valve chamber 86 and quick action chamber 42 will be slowly and completely vented to atmosphere through a choke port 104 in valve piston 99 whereupon closure of the spring-biased vent valve 100 will occur after a certain lapse of time. Such complete depletion of the air from the brake pipe 4 assures the rapid propagation of a reduction of brake pipe pressure at an emergency rate throughout the train.

In the emergency position, emergency piston 84, diaphragm type service piston 16 and their respective associated slide valves 88 and 23, respectively, allow pressurized air from the emergency reservoir 3 and auxiliary reservoir 2 to flow into the brake cylinder 5 until equalization of pressures has taken place therebetween. Emergency reservoir 3 is connected to the brake cylinder 5 via conduit 50, passageways 49, 48, cavity 105 in slide valve 88, passageways 106, 107, 74, chamber 75, past unseated inshot valve 76, passageway 77 and conduit 78. The auxiliary reservoir 2 is connected to the brake cylinder 5 via conduit 27, passageways 26, 25, lower valve chamber 21, passageways 68, 69, 70, bore 71, passageways 72, 73, 74, chamber 75, past inshot valve 76, passageway 77, and conduit 78.

A more detailed explanation of the control of the flow of pressurized fluid from the two reservoirs 3 and 2 to the brake cylinder device 5 is not deemed necessary for the present in view of the above explanation and the same being well known in the art.

Bore 71 in brake cylinder release portion 10 has an upwardly disposed enlarged bore portion 108, in which enlarged bore portion 108 is mounted a movable diaphragm type piston 109 comprising a pair of follower discs which clamp the inner peripheral edge of an annular resilient diaphragm 110. Diaphragm 110 has its outer peripheral edge clamped between portions of the casing 10 such that the diaphragm 110 cooperates with the casing 10 to define an upper chamber 111 and a lower chamber 112. A valve stem 113 slidably received by the bore 71 is suitably connected to the diaphragm type piston 109 for the controlling of ports to be described. Valve stem 113 has a reduced end portion 114, a pair of spaced annular grooves 115 and 116, and a pair of lands 117 and 118. Land 117 is between the reduced end portion 114 and groove 116, while land 118 is between the grooves 115 and 116. The reduced end portion of valve stem 113 has an annular valve member 119 cooperative with an annular valve seat 120, such that the upward relative movement of valve member 119 along with stem 113 connects the lower end portion of bore 71 with a chamber 121, which chamber 121 is connected to atmosphere via a protected exhaust port. Chamber 111 contains a spring 122 which is suitably seated therein having one end engaging movable diaphragm type piston 109 for biasing such piston 109 downwardly to seat valve member 119 on valve seat 120.

In a seated position of valve member 119, groove 116 on the periphery of valve stem 113 connects passageway 70 with the passageway 72. Passageway 72 extends circumferentially around bore 71 and extends on into brake cylinder release portion 10 for connection with chambers to be described. Annular groove 115 on the periphery of valve stem 113 connects a pair of spaced passageways 123 and 124. Passageway 124 encircles bore 71 and has one end connected to chamber 112 and the other end connected to a bore to be described; whereas, passageway 123 is connected to a chamber 125 closed off from chamber 29 by a normally seated check valve 126 which is adapted to be unseated by a manually operated plunger 127. The lower end of plunger 127 abuts a slidable valve member 128 which is actuated upward by a duplex release valve handle 129 in a manner well known and understood in the art to vent chamber 29 and auxiliary reservoir 2 connected thereto via passageways 28, 26 and conduit 27 to atmosphere via a restricted port 130 in valve member 128. In addition, slidable valve member 128 operates to actuate a plunger 131 adapted to actuate a check valve 132 in a manner well understood in the art to vent chamber 53 and emergency reservoir 3 connected thereto via passageways 47, 48, 49 and conduit 50 to atmosphere via restricted port 130. Duplex release handle 129 is also operative to actuate diaphragm type piston 109 in a manner to be described.

Brake cylinder release portion 10 has three spaced-apart chambers 133, 134 and 135. Each chamber has therein an annular valve seat 136 in its upper end portion cooperative with a corresponding spring-biased seated check valve member 137 for a purpose to be described. In addition, brake cylinder release portion 10 has a stepped bore 138 having a reduced upper bore portion 139. A piston valve 140 is slidably received within bore 138 for the control of ports via a peripheral annular groove 141 around the central portion thereof in a manner to be described. A spring 142 is mounted in the reduced bore portion 139 having its upper end seated on the upper end portion of bore 139 and the lower end thereof engaging the piston valve 140 for biasing piston valve 140 downwardly in bore 138. The lower end portion of bore 138 communicates via a passageway 143 with the lower end portion of chamber 134. In the normal position of piston valve 140, annular groove 141 is connected via a passageway 144 to the upper inner seated area of valve 137 in chamber 134. Above passageway 144 one end of the passageway 124 opens at the wall surface of bore 138. The passageway 124 is always in communication with the chamber 112 irrespective of the position of valve stem 113 since the passageway 124 encircles bore 71. Peripheral annular groove 141 on piston valve 140 communicates passageway 144 with passageway 124 when piston valve 140 is in its uppermost position. The upper outer end portions of chambers 133 and 134 are connected to the brake pipe 4 via passageways 145 and 37. The upper central end portion of chamber 133 is connected to atmosphere via passageway 146, chamber 125 and restricted port 130.

Assuming a train is operated on 110 p.s.i. such as is the case in a passenger train. Therefore, the brake pipe 4, the respective reservoirs 3 and 2 as well as valve chamber 51, quick action chamber 42 and lower valve chamber 21 are charged to 110 p.s.i.

Upon effecting an emergency application of the brakes, wherein the pressure in the brake pipe 4 is reduced at an emergency rate rapidly to atmospheric pressure, emergency piston 84 moves rightward as viewed in FIG. 1 to connect pressurized fluid from the emergency reservoir 3 to the brake cylinder 5 via conduit 50, passageways 49, 48, cavity 105, passageways 106, 107, 74, chamber 75, past inshot valve 76, and passageway 77. At the same time diaphragm type piston 16 moves to its uppermost or service position, as viewed in FIG. 2, to connect pressurized fluid from the auxiliary reservoir 2 to the brake cylinder 5 via conduit 27, passageways 26, 25, lower valve chamber 21, passageways 68 in the main slide valve 23, passageways 69, 70, peripheral annular groove 116, passageways 72, 73, 74, chamber 75, past inshot valve 76, passageway 77, and conduit 78. During such an emergency application, emergency valve chamber 86 and quick action chamber 42 will be at atmospheric pressure so that the several parts of the emergency portion 8 will remain in their emergency positions. The parts of the service portion 11 will also remain in their emergency application positon, since the brake pipe 4 and chamber 20 are completely vented while valve chamber 21 is at approximately 85 to 90 pounds per square inch pressure due to the equalization of pressure in the brake cylinder 5, auxiliary reservoir 2 and emergency reservoir 3.

In the event one of the railway cars is cut out of the passenger train whereupon an emergency brake application occurs, and thereafter it is desired to release pressurized fluid from the brake cylinder 5 of such a railway car without permitting the loss of pressurized fluid from the auxiliary and emergency reservoirs 3 and 2 respectively, the trainman will push the duplex release valve handle 129 inwardly which deflects the check valve 126 from its normal seated position. Such deflection of check valve 126 connects the pressurized air from chamber 29 which is connected to the auxiliary reservoir 2 as described above to the lower chamber 112 via passageway 123, peripheral annular groove 115, and passageway 124, to thereby move diaphragm type piston 109 along with the valve stem 113 upwardly, such that the chamber 112 is connected via passageway 124, peripheral annular groove 116, passageway 70, passageway 69 and passageway 68 in the main slide valve 23 to the lower valve chamber 21, which, in turn, is connected to the auxiliary reservoir 2 which is at the approximate equalized pressure of 85 to 90 p.s.i. Upon unseating of the check valve 126, fluid under pressure also flows from the chamber 29 to the chamber 85 on the right-hand side of the emergency piston 84 via past the unseated check valve 126 to the chamber 125, and thence through passageway 146, past left-hand check valve 137, chamber 133, passageways 145 and 37, chamber 35 and passageway 32. Fluid under pressure thus supplied to the chamber 85 is effective to immediately move the emergency piston 84, stem 87, graduated slide valve 89 and main emergency slide valve 88 from emergency position to release position in which the main emergency slide valve 88 laps the end of the passageway 48 that opens at the surface of the main emergency slide valve seat to thereby close communication between the emergency reservoir 3 and the brake cylinder device 5 to prevent loss of fluid under pressure from the emergency reservoir 3 when fluid under pressure is vented from the brake cylinder device 5 to atmosphere in the manner now to be described. Upon the pressurization of chamber 112 from the auxiliary reservoir 2, the trainman will release the duplex release valve handle 129. Brake cylinder 5 is now vented to atmosphere via conduit 78, passageway 77, a choke 76a connected in by-pass relation to inshot valve 76, chamber 75, passageways 74, 73, 72, past the reduced end portion 114 of valve stem 113, through chamber 121 and the protected exhaust port.

The upper end portion of bore 138 and bore 139 is connected to atmosphere via passageway 72, past reduced end portion 114 of valve stem 113, and through chamber 121 to atmosphere.

With the connection of such a railway car into a freight train operating at approximately 70 p.s.i., brake pipe 4 of such a railway car will receive pressurized fluid at approximately 70 p.s.i. Such pressure fluid, in addition to flowing into brake pipe chamber 36 and piston chamber 20, will flow via passageways 37, 145 into chamber 134, thence via passageway 143 to the lower end portion of bore 138 to raise the piston valve 140 upwardly against the bias of spring 142 to thereby connect auxiliary reservoir air present in chamber 21 to the brake pipe 4 via passageways 68, 69, 70, groove 116, passageway 124, peripheral annular groove 141, passageway 144, thence past the right-hand check valve 137, to chamber 134 and through passageways 145 and 37. Such flow of pressurized air from the auxiliary reservoir 2 to the brake pipe 4 will equalize the pressures at about 65 p.s.i.

Thereafter, accelerated release valve 52 is actuated since the auxiliary reservoir air in chamber 58, which is connected to the lower valve chamber 21, has been reduced to approximately 65 p.s.i. whereas brake pipe pressure is increasing, so that with a continuation of the build-up of pressure in the brake pipe 4, the pressure in chamber 57 is similarly increased since it is connected to the brake pipe 4 via passageways 59, 40, 39, chamber 36 and passageway 37. The pressure differential across accelerated release valve 52 operates to move diaphragm 56 leftward, as viewed in FIG. 2, to cause stem 62 to unseat valve 61 to connect pressurized fluid from the emergency reservoir 3 and present in chamber 51 to the brake pipe 4 for charging thereof via passageway 64, chamber 65, past check valve 66, passageways 67, 40, 39, chamber 36, and passageway 37. Pressurized fluid in chamber 51 is substantially at 85–90 p.s.i. since such fluid in chamber 51 is connected to the emergency reservoir 3 via passageways 47, 48, 49, and conduit 50. Such actuation of the accelerated release valve 52 permits the flow of pressurized fluid from the emergency reservoir 3 to the brake pipe 4 to accelerate the build-up of the brake pipe pressure.

With the build-up of brake pipe pressure, piston chamber 20 also receives pressurized fluid since it is connected to the brake pipe 4 via passageway 40, passageway 39, chamber 36 and passageway 37 so that the diaphragm type piston 16 moves into its retarded recharge position such that the main slide valve 23 connects chamber 112 under diaphragm type piston 109 to atmosphere via passageway 124, peripheral annular groove 116, passageways 70, 69, through cavity 147 in slide valve 23, passageways 148 and 149 to atmosphere. Such reduction of pressurized fluid in chamber 112 renders spring 122 effective to move valve stem 113 downwardly to the normal position shown in FIG. 2, wherein chamber 112 is connected to atmosphere via passageway 124, groove 115, passageway 123, chamber 125 and restricted port 130.

Piston valve 140 is returned to its lowermost position upon a subsequent brake application since the lower end portion of bore 138 is connected to the brake pipe 4 which would experience a reduction in brake pipe pressure upon a brake application, whereas the upper end portion of bore 138 is connected to the brake cylinder 5 which would experience an increase in pressurized fluid to thereby move piston valve 140 downwardly into its lowermost position.

Having now described the invention, what I claim as new and desire to secure by Letters Patent, is:

1. In a fluid brake equipment having a brake pipe normally charged with pressurized fluid, reservoir means normally charged with pressurized fluid, a brake cylinder, and a brake controlling valve device responsive to a reduction in pressure in the brake pipe to supply pressurized fluid from said reservoir means to said brake cylinder to effect an application of the brakes and responsive to an increase in brake pipe pressure to release the pressurized fluid from said brake cylinder, in combination:

(a) brake releasing valve means operative between a first and second position, (b) means biasing said brake releasing valve means into said first position, (c) means for moving said brake releasing valve means into said second position, (d) said brake releasing valve means operative in said second position to connect said brake cylinder to atmosphere, (e) a piston valve normally biased by spring means to a first position, (f) said piston valve having opposing chambers wherein one of said chambers houses said spring means, (g) said one chamber being operatively connected to said brake cylinder, (h) the other of said chambers being directly connected to said brake pipe, (i) said piston valve being movable to a second position upon pressurization of said other chamber and venting of said one chamber, and (j) said brake releasing valve means in said second position cooperative with said piston valve in said second position for communicating said reservoir means to said brake pipe for equalization of pressures therebetween.

2. A brake controlling valve device for a railway vehicle comprising:

(a) a pair of movable valve members, (b) one of said valve members having one end connected to a conduit, (c) means engaging said one end for biasing said one valve member into inoperative position, (d) said conduit being adapted to be connected to the brake cylinder of such a vehicle, (e) means operatively connected to the other of said valve members for actuation thereof to connect said conduit and said one end to atmosphere, (f) the other end of said one valve member connected to a passageway adapted to be connected to the brake pipe of the railway vehicle upon pressurization thereof, (g) said one valve member actuated by the introduction of pressurized fluid into said passageway from brake pipe and the venting of said conduit, and (h) said one valve member being operative in said actuated position for connecting a pipe adapted to be connected to an auxiliary reservoir of such a railway vehicle through said other valve member in actuated position to said passageway for pressurization of such brake pipe from such auxiliary reservoir.

3. A brake controlling valve device for controlling the application of brakes on a railway vehicle having an auxiliary reservoir and a brake cylinder including:

(a) valve means having a pair of oppositely disposed chambers, (b) means mounted in one of said chambers biasing said valve means into an inoperative position, (c) a conduit in said valve device adapted to be connected to such a brake cylinder, (d) said conduit connected to said one chamber, (e) the other of said chambers connected to a passageway adapted to be connected to the brake pipe for actuating said valve means upon pressurization thereof, (f) another valve means normally biased to block communication between said conduit and a vent, (g) manually operable means operative to actuate said other valve means for connecting said conduit and said one chamber to said vent, and (h) means operative upon actuation of said valve means to communicate a pipe adapted to be connected to the auxiliary reservoir of a railway vehicle with said passageway whereby the brake pipe is charged by such auxiliary reservoir.

4. A brake controlling valve device operative upon a gradual or service reduction in brake pipe pressure for supplying fluid under pressure from a normally charged auxiliary reservoir to a brake cylinder to effect a service application of the brakes, said valve device operative upon a sudden or emergency reduction in brake pipe pressure for supplying fluid under pressure from the auxiliary reservoir and a supplementary reservoir to the brake cylinder to effect an emergency application of the brakes, (a) a pair of spaced valve members mounted in said valve device, (b) one of said valve members normally establishing a first communication for connecting a pair of conduits wherein one of said conduits is adapted to be connected to the brake cylinder and the other of said conduits is adapted to be connected to the auxiliary reservoir during a sudden or emergency reduction in brake pipe pressure, (c) the other of said valve members having a pair of opposed chambers, (d) one of said chambers having a connection to said one conduit at all times, (e) biasing means in said one chamber for maintaining said other valve member in de-actuated position, (f) the other of said chambers connected to a passageway adapted to be connected to the brake pipe for pressurization of said other chamber, (g) manually operable means operatively connected to said one valve member for actuation thereof for establishing a communication between said one conduit and a vent to atmosphere to thereby vent said one conduit and said one chamber, (h) said other valve actuated by pressurization of said other chamber and venting of said one chamber, and (i) means operative upon actuation of both of said valve members for connecting said other conduit to said passageway whereby the brake pipe is conditioned for connection to the auxiliary reservoir for pressurization therefrom.

5. A brake controlling valve device as set forth in claim 4 wherein:

(a) said one valve member has a diaphragm piston cooperative with said valve device to define a pressure control chamber, and (b) said manually operable means includes a displaceable valve operative to connect pressurized fluid from the auxiliary reservoir to said pressure control chamber for maintaining said one valve member in actuated position.

6. A brake control valve device as set forth in claim 5 wherein:

(a) said manually operable means includes a manually operable member movable into engagement with said displaceable valve for venting the auxiliary chamber to atmosphere.

7. In a fluid pressure brake equipment:

(a) a brake pipe, (b) an auxiliary reservoir, (c) an emergency reservoir, (d) brake cylinder means operable by fluid under pressure to effect an application of brakes and operable upon release of fluid to effect a release of brakes, (e) a brake controlling valve device operatively connected to said brake pipe and operable upon an increase in brake pipe pressure to supply fluid under pressure to said reservoir and to release fluid under pressure from said brake cylinder means, (f) said brake controlling valve device operable upon a sudden reduction in brake pipe pressure to open communication between said reservoirs and said brake cylinder means for supplying fluid under pressure to said brake cylinder means and equalizing the pressures therebetween, (g) valve means (brake cylinder release portion and valve) operable upon actuation thereof to vent said brake cylinder means, (h) means (duplex release valve) operable to actuate said valve means, and (i) said valve means in actuated position responsive to pressurization of said brake pipe connecting pressurized fluid from said auxiliary reservoir to said brake pipe for charging thereof.

8. In a fluid pressure brake equipment:

(a) a brake pipe, (b) an auxiliary reservoir, (c) an emergency reservoir, (d) brake cylinder means operable by fluid under pressure to effect an application of brakes and operable upon release of fluid to effect a release of brakes, (e) a brake controlling valve device operatively connected to said brake pipe and operable upon an increase in brake pipe pressure to supply fluid under pressure to said reservoir and to release fluid under pressure from said brake cylinder means, (f) said brake controlling valve device operable upon a sudden reduction in brake pipe pressure to establish communication between said reservoirs and said brake cylinder means for supplying fluid under pressure to said brake cylinder means and equalizing the pressures therebetween, (g) said brake controlling valve device in said last-mentioned operable position defines an emergency position, (h) valve means having a normally biased open connection in said communication, (i) means operable to actuate said valve means to close said connection and release fluid under pressure from said brake cylinder means, and (j) said valve means in actuated position responsive to pressure in said brake pipe to connect said auxiliary reservoir to said brake pipe during emergency position of said brake controlling valve device.

9. A brake controlling valve device for controlling brake means on a railway vehicle including a housing portion having:

(a) a valve reciprocably mounted therein, (b) means mounted in one portion of said housing biasing said valve into a first position, (c) said one portion cooperative with said housing to define a first chamber, (d) a conduit connected to said one chamber wherein said conduit is adapted to be connected to the brake cylinder, (e) said valve cooperative with said housing portion to define a second chamber oppositely disposed relative to said first chamber, (f) a passageway connected to said second chamber wherein said passageway is adapted to be connected to the brake pipe, (g) another valve normally biased to block communication between said conduit and a vent, (h) manually operable means operatively connected to said other valve for actuation thereof for opening communication between said conduit and said vent, (i) said first-mentioned valve movable into a second position upon pressurization of said second chamber and actuation of said other valve, and (j) means operative upon actuation of said other valve and movement of said first-mentioned valve into said second position for connecting a pipe adapted to be connected to the auxiliary reservoir to said passageway, which passageway is adapted to be connected to the brake pipe of the railway vehicle.

10. In a fluid pressure brake equipment, in combination:

(a) a brake pipe normally charged to a first chosen pressure for passenger train service and to a second chosen pressure less than said first chosen pressure for freight train service, (b) an auxiliary reservoir normally charged to the pressure carried in said brake pipe, (c) an emergency reservoir normally charged to the pressure carried in said brake pipe, (d) a brake cylinder device operable by fluid under pressure supplied thereto to effect a brake application and operable upon the release of fluid under pressure therefrom to effect a release of the brakes, (e) a brake control valve device having a service portion and an emergency portion, each operable to a first position upon an increase in pressure in said brake pipe to a pressure corresponding to one of said train services to effect charging of said reservoirs to the pressure in said brake pipe, and to release fluid under pressure from said brake cylinder device, (f) said service portion and said emergency portion being each operable to a second position in response to an emergency rate of reduction in the pressure in said brake pipe to establish respectively, a first communication between said auxiliary reservoir and said brake cylinder device through which fluid under pressure is supplied from said auxiliary reservoir to said brake cylinder device, and a second communication between said emergency reservoir and said brake cylinder device through which fluid under pressure is supplied from said emergency reservoir to said brake cylinder device, to cause an equalization of pressure between said reservoirs and said brake cylinder device, said equalization pressure for said passenger train service being higher than the normally charged brake pipe pressure for said freight train service, (g) a fluid pressure operated brake cylinder release valve device disposed in said first communication and operable to close said first communication between said auxiliary reservoir and said brake cylinder device and vent the latter to atmosphere, (h) a check valve device having its outlet connected to said brake pipe, (i) a manually operable duplex reservoir release valve device so disposed that upon manual operation thereof, fluid under pressure is supplied from said auxiliary reservoir respectively, past said check valve device to said brake pipe to cause operation of said emergency portion of said brake control valve device from its second position to its first position to close said second communication between said emergency reservoir and said brake cylinder device, and to said fluid pressure operated brake cylinder release valve to cause the operation thereof to respectively close said first communication and completely vent said brake cylinder device to atmosphere, and (j) valve means operable in response to an increase in the pressure in said brake pipe, only subsequent to the successive operation of said service and emergency portions of said brake control valve device from their first position to their second position and manual operation of said duplex reservoir release valve device to cause respectively, said emergency portion to move from its second position to its first position, and said fluid pressure operated brake cylinder release valve device to completely vent said brake cylinder device, to establish a communication between said auxiliary reservoir and said brake pipe, irrespective of the value of said equalization pressure in said auxiliary reservoir whereby fluid under pressure flows from said auxiliary reservoir to said brake pipe until the pressures in said auxiliary reservoir and said brake pipe are substantially equalized thereby rendering said service portion of said brake control valve device operative upon a further increase in the pressure in said brake pipe to move from its second position to its first position to effect a recharge of said reservoirs.

11. A fluid pressure brake equipment as claimed in claim 10, further characterized in that said service portion of said brake control valve device includes an accelerated service release valve mechanism that is operable upon a further increase in the pressure in said brake pipe, subsequent to operation of said valve means to cause equalization of the pressures in said auxiliary reservoir and said brake pipe, to establish a communication between said emergency reservoir and said brake pipe to cause equalization of pressures therebetween.

References Cited by the Examiner
UNITED STATES PATENTS

| | | | |
|---|---|---|---|
| 393,872 | 12/1888 | Williams | 303—70 |
| 1,494,734 | 5/1924 | Clark | 303—70 |

EUGENE G. BOTZ, *Primary Examiner.*